(12) United States Patent
Schillegger et al.

(10) Patent No.: US 6,533,425 B1
(45) Date of Patent: Mar. 18, 2003

(54) RETRACTABLE REAR-VIEW MIRROR FOR MOTOR VEHICLES

(75) Inventors: Peter Schillegger, Nestelbach (AT); Bernhard Schadler, Sinabelkirchen (AT)

(73) Assignee: Magna Auteca Ag, Weiz (AT)

( * ) Notice: Subject to any disclaimer, the term of this patent is extended or adjusted under 35 U.S.C. 154(b) by 0 days.

(21) Appl. No.: 10/030,274

(22) PCT Filed: Jun. 29, 2000

(86) PCT No.: PCT/EP00/06086
§ 371 (c)(1),
(2), (4) Date: Apr. 3, 2002

(87) PCT Pub. No.: WO01/03975
PCT Pub. Date: Jan. 18, 2001

(30) Foreign Application Priority Data

Jul. 7, 1999 (DE) .......................................... 199 32 262

(51) Int. Cl.[7] ............................ B60R 1/06; G02B 7/182; F16H 35/00
(52) U.S. Cl. ....................... 359/841; 359/872; 359/877; 248/900; 74/640; 74/664
(58) Field of Search .................................. 359/841, 877, 359/838, 871, 872; 248/475.1, 476, 477, 900; 74/840, 640, 665 R

(56) References Cited

U.S. PATENT DOCUMENTS

| 4,491,033 A | * | 1/1985 | Carlson et al. | ................. | 74/640 |
| 4,574,659 A | * | 3/1986 | Arndt | ............................. | 475/5 |
| 5,684,646 A | * | 11/1997 | Boddy | ........................ | 359/841 |

FOREIGN PATENT DOCUMENTS

| DE | 19912761 A1 | 9/1999 |
| EP | 0 644 084 B1 | 5/1998 |
| JP | 63046939 A | 2/1988 |
| WO | WO 97/14208 A1 * | 4/1997 |

OTHER PUBLICATIONS

Mechanisms & Mechanical Devices Sourcebook, Third ed., Neil Sclater & Nicholas P. Chironis, editors, Ch. 8, pp. 263–265, "Harmonic–Drive Speed Reducers". McGraw–Hill, New York, 2001.*

Univ.–Prof. Dr.–Ing. P.W. Gold; Harmonic Drive Getriebe; page "Teaching offer of the Institute"; Home Page of the Institute for Machine Elements; Main Page of RWTH of Aix–la–Chapelle; with English translation (no date).

* cited by examiner

*Primary Examiner*—John Juba, Jr.
(74) *Attorney, Agent, or Firm*—Marshall & Melhorn, LLC

(57) ABSTRACT

The invention relates to a retractable rear-view mirror for motor vehicles. Said rear-view mirror comprises a fixed base, a swiveling mirror unit and a rotation driving unit composed of a motor and a transmission. In order to minimize the friction losses while requiring a minimal space and providing a favorable assembling shape: a) the transmission of the rotation driving unit is a harmonic drive transmission having a central axis which is coaxial with the rotation axis of the mirror unit; b) said voltage wave transmission contains an eccentric means in its transmission casing, an elastic annular gear and two driven links which co-operate with said annular ring and have a different number of teeth; c) the eccentric means has a toothed work which engages the pinion gear of said motor; d) one driven link engages the base and the other driven link engages the mirror unit. The eccentric means is placed inside the elastic annular ring and the two driven links are placed outside of the elastic annular ring. One driven link is integrated to the transmission casing and the other one engages the part which can move relatively to the transmission casing.

9 Claims, 3 Drawing Sheets

RETRACTABLE REAR-VIEW MIRROR FOR MOTOR VEHICLES

FIELD OF THE INVENTION

The invention relates to a folding rear-view mirror for motor vehicles consisting of a base tightly seated on the motor vehicle, a mirror unit capable of swiveling relative to the latter about an axis and a pivot drive unit composed of a motor and a drive gear. The invention relates in particular to external rear-view mirrors which under the control of an electric motor are not only adjustable from the interior of the vehicle but can also be swiveled inwards when driving through a car wash for instance. The swivel axis is substantially vertical so that the surface of the mirror is aligned roughly parallel to the side wall of the vehicle when the mirror is swiveled inwards.

In the operating position the mirror unit must remain exactly in position, even against air resistance during fast driving. For this reason it is held by a form-locking, usually spring-loaded positioning device and the drive must be self-locking when external forces act on the mirror unit. That means friction losses. When the entire mirror unit is swiveled inwards these forces must be overcome, which requires a considerable driving torque. This requires a powerful and, therefore, large motor and/or a very high transmission ratio in the drive gear when then also generates the self-locking at the expense of friction losses. The friction losses further increase the motor power required and reduce service life.

However the design is effected the construction space for the entire pivot drive unit is considerable. Regardless of how the pivot drive unit is accommodated in the base or in the mirror unit construction space is very scarce. Accordingly, the drive unit should be of the smallest possible size.

DISCUSSION OF RELATED ART

EP 644 084 P discloses a rear-view mirror in accordance with the generic category whose pivot drive unit consists of an electric motor and a transmission gear both of which are accommodated in the mirror unit. The transmission gear possesses two worm stages and two spur wheel stages in order to attain the required transmission ratio and degree of self-locking. It accordingly needs a relatively large construction space, especially to the side of the swivel axis and under the electric motor, which has a detrimental effect on the shape of the mirror unit and fouls the adjustment drive of the mirror. It is further disadvantageous that the worm stages generate high axial forces which must be transmitted into the housing and suffer from high wear with great frictional losses despite the structural parts being made of metal.

SUMMARY OF THE INVENTION

Accordingly, the aim of the invention is to construct and arrange the pivot drive unit in such a way that with an overall minimal requirement for space and a favorable assembled shape minimum frictional losses and high operational reliability are attained while production is simple.

According to the invention this achieved as follows by the characterizing characteristics of the first claim.

(a) Very large transmission ratios in the smallest construction space and with only small frictional losses may be achieved with a strain-wave gear which nevertheless is self-locking. Specifically the normally unnoted property of a cocking-lever shaft gear to be self-locking despite low frictional losses is very valuable in this case. In addition it produces no axial forces. Due to the central axis of the strain-wave gear being coaxial with the swivel axis of the mirror unit the small axial width of such a gear can be fully utilized and its internal region be used to accommodate the swivel axis.

(b) The construction of the strain-wave gear with a driving eccentric, an elastic annular gear and two coaxial power take-off members working together with the latter and having different numbers of teeth is particularly space-saving and low in friction. The latter also allows the use of a weaker and consequently smaller motor.

(c) The strain-wave gear is especially small and low in friction when the driving eccentric has an external toothed structure in drive engagement with a pinion of the motor. Drive then ensues to a certain extent from the side which further reduces the overall height and allows good dissipation of gearing forces. Moreover, in this way the motor can be arranged apart from the swivel axis and with its power take-off pinion very low which is further to the benefit of the fitting dimensions.

(d) As a result that of the two power take-off members coaxial with one another and with the swivel axis one has a drive connection to the base and one to the mirror unit the two power take-off members are arranged directly coaxially with the parts to which they are connected, the base and mirror unit, without an further transmission-members being required. In this way the overall shape of the drive unit is ideally adapted to the fitting situation.

In a preferred specific embodiment the driving eccentric of the strain-wave gear is arranged inside and the two power take-off members are arranged outside the elastic annular gear and one of the two power take-off members is part of the gear housing and the other power take-off member has a drive connection to the part which is movable relative to the gear housing (claim 2). The movable part can be both the base as well as the mirror unit. In both cases due to the power take-off on the outside power transmission is again possible without any intermediate members. The drive from the inside results in a particularly good arrangement of the elastic annular gear which increases the power density.

A particularly light and space-saving design is achieved when the driving eccentric possesses at least two sliding blocks arranged at the same angular spacing from one another which slide on the inside of the elastic annular gear (claim 3). Between these the driving eccentric has support webs (claim 4) which prevent sagging of the elastic annular gear between the sliding blocks which can cause poor engagement of the teeth.

Advantageously, the driving eccentric has a central opening for the passage of the pivot pin and runs substantially in the plane of its outer toothed structure in bearings of which one is seated in one power take-off member and one in the other power take-off member or in parts rigidly connected thereto (claim 5). The cocking-lever shaft gear is thus built around the axis about which the mirror unit is pivoted. The driving eccentric is precisely mounted and centered which makes a considerable contribution to clean engagement and low wear of the gear parts so that they can even be made of plastic.

In a refinement of the invention the drive connection between the pinion of the motor and the outer toothed structure of the driving eccentric can be established via at least one spur wheel stage (claim 6). Apart from the greater transmission ratio made possible in this way this allows still greater freedom of design for the outer shape of the pivot drive unit because the motor can be arranged further from the-swivel axis.

In a preferred specific embodiment the pivot drive unit is accommodated in the mirror unit and the drive member not connected to the housing has a drive connection to a hollow axle connected in non-slipping manner to the base (claim 7). The attachment of the pivot drive unit in the moving part in which the spatial conditions are a little more favorable than in the base does not give rise to further expense since the leads for displacing the mirror are also led through the hollow axle.

The small axial height of the gear and the motor arranged apart allow enough space for a spring-loaded torque limiting coupling arranged between the power take-off member and the hollow axle, this being arranged on one side of the housing and the spring on the other side of the housing (claim 8). This affords an ideal arrangement with minimum requirement for space and there is even still space for a thrust bearing between the two power take-off members (claim 9) which further reduces frictional losses and wear.

BRIEF DESCRIPTION OF THE DRAWINGS

The invention is described and explained below with reference to figures. These show.

DESCRIPTION OF THE PREFERRED EMBODIMENT

Figure 1:
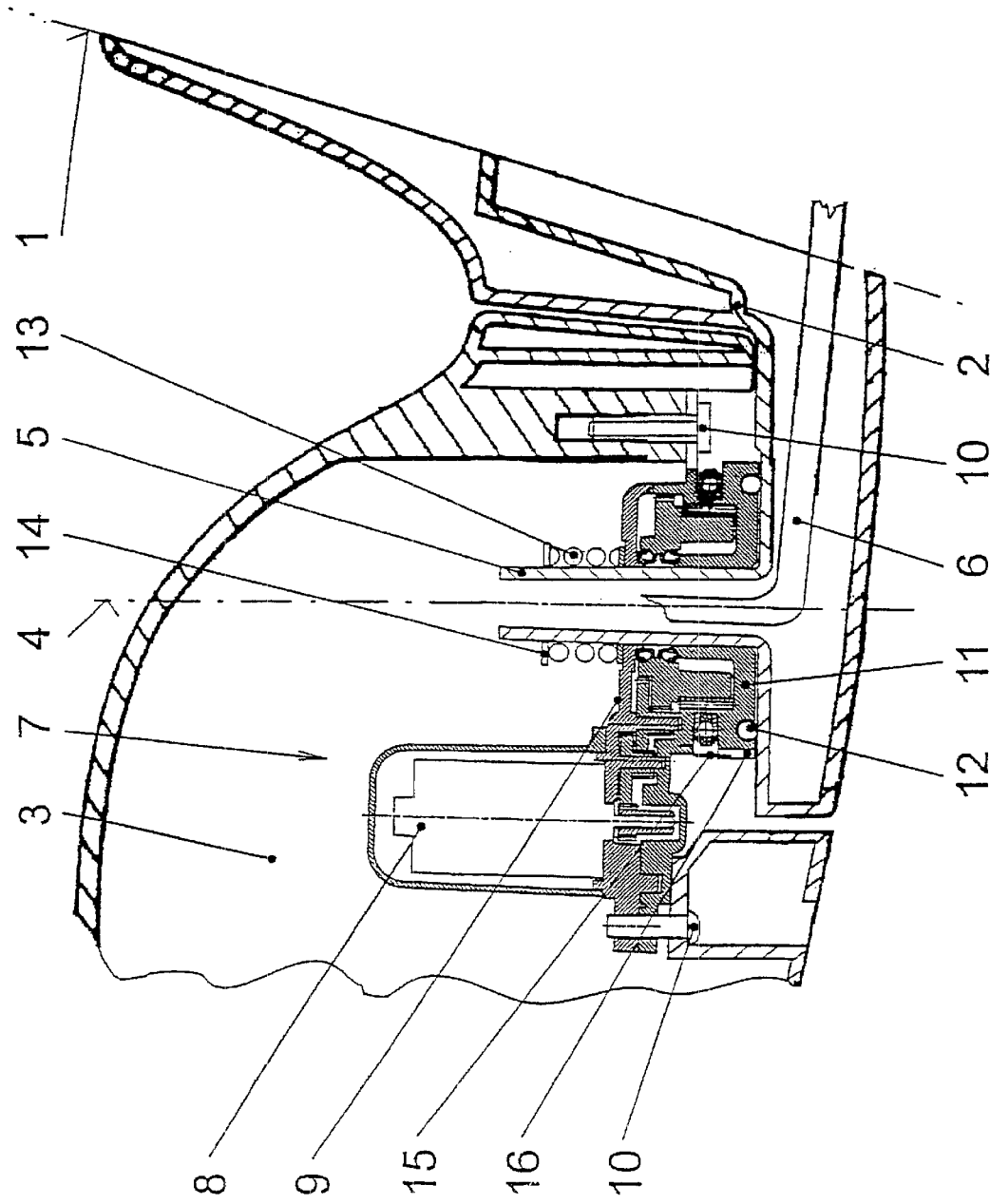
FIG. 1: A rear-view mirror according to the invention partially in section.

In FIG. 1 the rear-view mirror according to the invention is illustrated only in part. On the side surface 1 of the A pillar of a motor vehicle which is merely indicated a base 2 is attached in fixed manner. It supports a mirror unit 3 which can be swiveled relative to the base 2 about an axis of rotation 4. For this purpose a hollow pivot pin 5 is attached in fixed manner to the base 2 or forms part of the latter. It is constructed hollow for feeding electric cables 6 through. Fastened in the mirror unit 3 is a pivot drive unit designated overall by 7. It consists substantially of an electric motor 8 and a gear 9 which is fastened in the mirror unit 3 by means of screws 10.

The pivot drive unit 7 possesses a parent member 11 which loosely surrounds the hollow pivot pin 5 and is frictionally connected to a limited extent to the base 2 via a torque-limiting coupling 12. The torque-limiting coupling is one of the known types, with balls in this case. The contact pressure required for torque transmission via these balls is exerted on the gear 9 by a pressure spring 13. The pressure spring 13 is supported, for instance, on a snap ring 14. The relative twisting between the parent member 11 and the gear 9 is limited by a finger 15 which works together with a limit stop 16 on the parent member 11.

Figure 2:
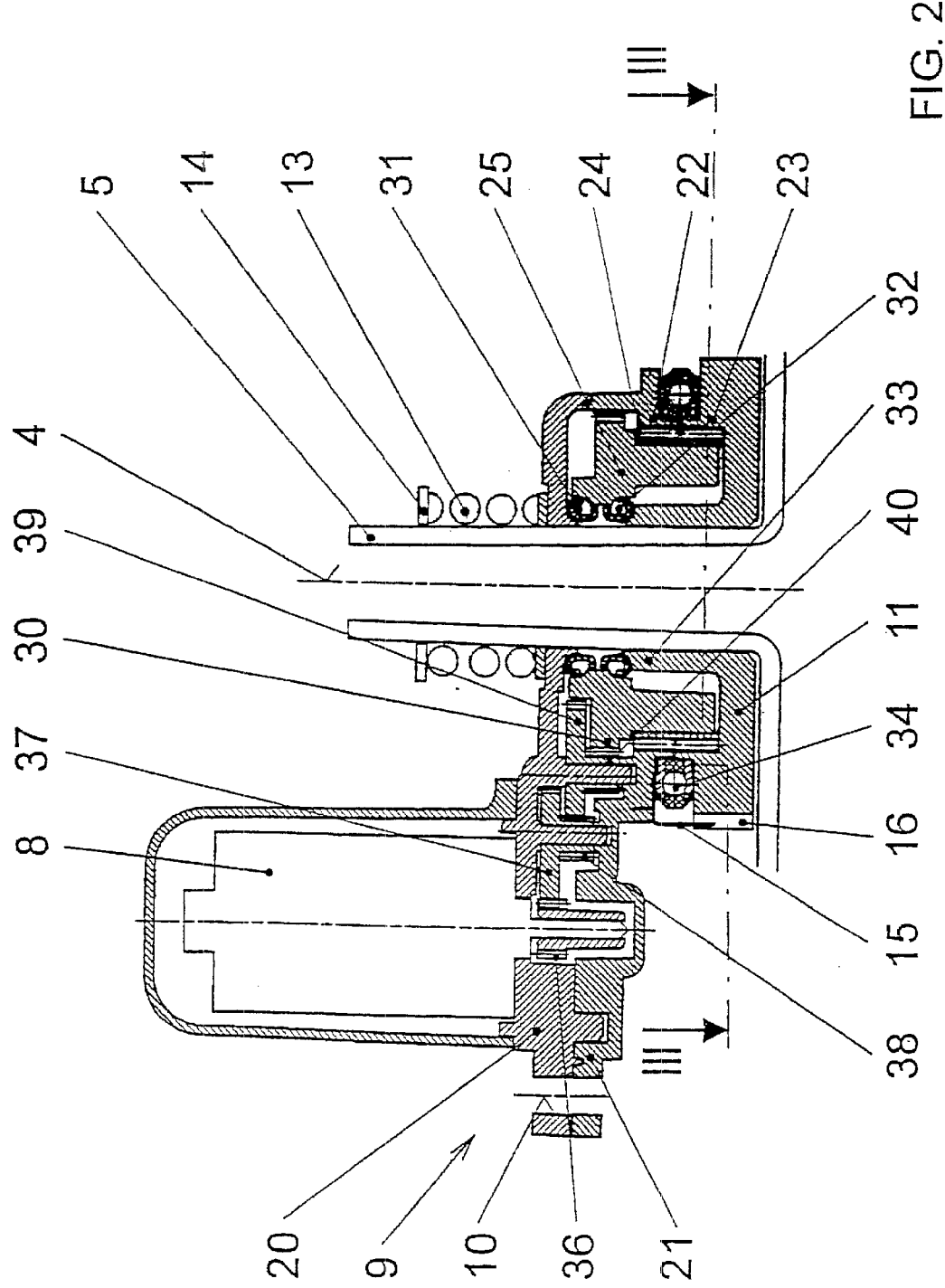
FIG. 2: The drive unit of FIG. 1 enlarged and in longitudinal section.
Figure 3:
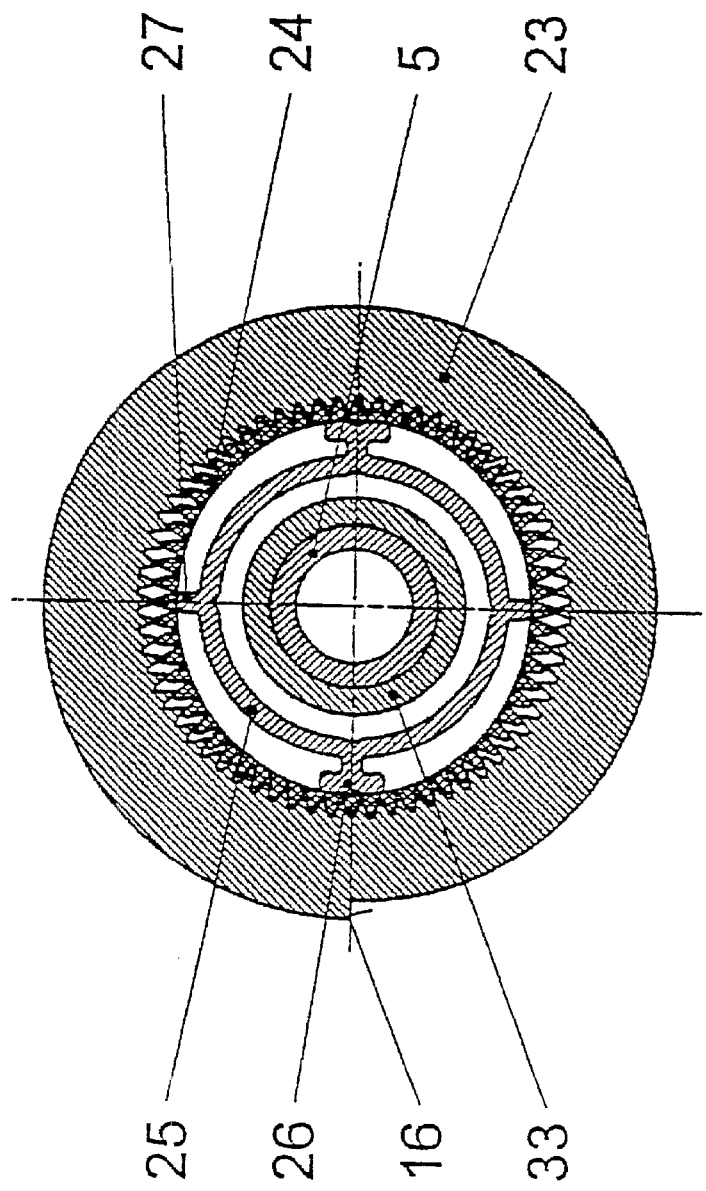
FIG. 3: Section III—III in FIG. 2.

FIGS. 2 and 3 show the pivot drive unit 7 in detail. The housing consists of a housing upper part 20 and a housing lower part 21 which are tightly connected to one another, for example directly by means of the screws 10. The housing contains a strain-wave gear which is concentric with the axis of rotation 4 and consists of the following parts: a first power take-off member 22 with the number of teeth Z1, which here is an integral component of the housing lower part 21, a second power take-off member 23 with the number of teeth Z2, which here forms one piece with the parent member 11, an elastic annular gear 24 with an outer toothed structure having the number of teeth Z3 and a smooth inner surface and of a driving eccentric 25 having two sliding blocks 26 located opposite one another and between them two support webs 27 located opposite one another.

The numbers of teeth Z1, Z2 and Z3 differ from one another and are chosen according to the desired transmission ratio. The two power take-off members 22,23 are very narrow and coaxially arranged side by side and the elastic annular gear 24 works together with the two power take-off members 22,23 in such a way that it is pushed by the sliding-blocks 26 into the inner toothed structures of the two power take-off members 22,23. The support webs support the non-engaging part of the elastic annular gear 24 so that this cannot execute any uncontrolled movements which would impair its meshing.

Outside the part working together with the elastic annular gear 24 the driving eccentric 25 possesses an outer toothed structure 30 and is guided in bearings 31,32 approximately in the plane normal to the axis of this driving toothed wheel. The bearing 31 is arranged in the housing upper part 20 and the lower bearing 32 in the parent member 11 for which purpose the latter possesses an upwardly projecting collar 33. The fast-running driving eccentric 25 is thus supported on the one hand with respect to the housing 10 and on the other hand with respect to the very slowly turning parent member 11 which is remarkable.

In the specific embodiment depicted the electric motor 8 drives the driving eccentric 25 by means of its motor pinion 36 via two spur wheel stages. These spur wheel stages are driven by a first greater wheel 37 forming one piece with a first pinion 38 and via a second greater wheel 39 forming one piece with a second pinion 40. The two greater wheel pinion units (37,38 and 39,40) can be identical parts. Here the second pinion 40 finally drives the working eccentric 25 via its outer,toothed structure 30. Between the first and second power take-off member 22,23 an axial bearing 34 is provided which transmits the force exerted by the pressure spring 13 onto the parent member 11.

From the described figures it may be seen how small the pivot drive unit is due to the use of a cocking-lever shaft drive and due to the special arrangement of the latter. Within the scope of the invention many modifications are possible both with regard to the arrangement of the gear in the base 2 or in the mirror member 3 as well as in the design of the strain-wave gear and in the number and arrangement of the spur wheel stages preceding these.

What is claimed is:

1. Folding rear-view mirror for a motor vehicle consisting of a base (2) tightly seated on the motor vehicle, a mirror unit (3) capable of swiveling relative to the latter about an axis and a pivot drive unit composed of a motor and a gear, characterized in that a) the gear (9) of the pivot drive unit (7) is a strain-wave gear whose central axis is coaxial with the pivot axis (4) of the mirror unit (3), b) the strain-wave gear contains in its gear housing (20,21) a driving eccentric (25), an elastic annular gear (24) and working together with the latter two coaxial power take-off members (22,23) with different numbers of teeth, c) the driving eccentric (25) has an outer toothed structure (30) having a drive connection to a pinion (36) of the motor (8), d) of the two power take-off members (22,23) one (23) has a drive connection to the base (2) and one has a drive connection to the mirror unit (3).

2. Folding rear-view mirror according to claim 1, characterized in that the driving eccentric (25) is arranged inside and the two power take-off members (22,23) outside the elastic annular gear (24), one of the two power take-off members (22) is part of the gear housing (20,21) and the second of the two power take-off members (23) has a drive connection to the mirror unit (2;3) movable relative to the gear housing (20,21).

3. Folding rear-view mirror according to claim 2, characterized in that the driving eccentric (25) possesses at least two sliding blocks (26) which are arranged at the same angular spacing from one another and slide on the inside of the elastic annular gear (24).

4. Folding rear-view mirror according to claim 3, characterized in that the driving eccentric (25) possesses support webs (27) between the sliding blocks.

5. Folding rear-view mirror according to claim 2, characterized in that the driving eccentric (25) has a central opening for the passage of the pivot pin (5) and substantially in the plane of its outer toothed structure (30) runs in bearings (31,32) of which one (31) is seated in one power take-off member (22) and one (32) in a part connected to the other power take-off member (23) or in parts fixedly connected thereto.

6. Folding rear-view mirror according to claim 2, characterized in that the pivot drive unit (7) is accommodated in the mirror unit (3) and the power take-off member not connected to the housing (21,22) has a drive connection to a hollow pivot pin (5) connected in non-slipping manner to the base.

7. Folding-rear-view mirror according to claim 6, characterized in that the drive connection between the power take-off member (11) and the base (2) or the hollow pivot pin (5) is established via a spring-loaded torque limiting coupling (12) arranged on one side of the gear housing (21,22), the spring (13) being arranged on the other side of the housing (21,22).

8. Folding rear-view mirror according to claim 7, characterized in that a thrust bearing (34) is provided between the two power take-off members (22, 23).

9. Folding rear-view mirror according to claim 1, characterized in that the drive connection between the pinion (36) of the motor (8) and the outer toothed structure (30) of the driving eccentric (25) is established via at least one spur wheel stage (37,38; 39,40).

* * * * *